United States Patent
Di Cairano-Gilfedder et al.

(10) Patent No.: US 11,996,984 B2
(45) Date of Patent: May 28, 2024

(54) SOFTWARE DEFINED NETWORK SPECIFICATION

(71) Applicant: BRITISH TELECOMMUNICATIONS PUBLIC LIMITED COMPANY, London (GB)

(72) Inventors: Carla Di Cairano-Gilfedder, London (GB); Anthony Conway, London (GB); Samuel Gaffney, London (GB); Gilbert Owusu, London (GB)

(73) Assignee: British Telecommunications Public Limited Company (GB)

( * ) Notice: Subject to any disclaimer, the term of this patent is extended or adjusted under 35 U.S.C. 154(b) by 0 days.

(21) Appl. No.: 17/906,370

(22) PCT Filed: Mar. 5, 2021

(86) PCT No.: PCT/EP2021/055638
§ 371 (c)(1),
(2) Date: Sep. 15, 2022

(87) PCT Pub. No.: WO2021/185603
PCT Pub. Date: Sep. 23, 2021

(65) Prior Publication Data
US 2023/0188428 A1    Jun. 15, 2023

(30) Foreign Application Priority Data

Mar. 16, 2020 (EP) ..................................... 20163461

(51) Int. Cl.
*H04L 41/22* (2022.01)
*H04L 41/122* (2022.01)
*H04L 41/40* (2022.01)

(52) U.S. Cl.
CPC ............ *H04L 41/122* (2022.05); *H04L 41/40* (2022.05)

(58) Field of Classification Search
CPC ........................... H04L 41/1227; H04L 41/40
(Continued)

(56) References Cited

U.S. PATENT DOCUMENTS 10,032,267 B2    7/2018  Strebel et al.
2008/0049614 A1  2/2008  Briscoe et al.
(Continued)

FOREIGN PATENT DOCUMENTS

CN    109992579 A     7/2019
WO    2021185602 A1   9/2021

OTHER PUBLICATIONS

"Combined Search and Examination Report under Sections 17 and 18(3) for Great Britain Application No. 2003809.7, dated Dec. 17, 2020".

(Continued)

*Primary Examiner* — Sibte H Bukhari
(74) *Attorney, Agent, or Firm* — Pranger Law PC (57) ABSTRACT

A computer implemented method to specify a software defined network (SDN) for deployment by an SDN controller, the SDN controller being adapted to configure a plurality of physical network components to deliver communication services, the method including generating a model of the physical network components by accessing each of a plurality of data sources; defining the model including an indication of a location, type and interconnections of physical components based on the data sources; associating each indication in the model with a degree of confidence of accuracy of the indication based on the degree of confidence information from the data sources; accessing a set of rules defining relationships between types of physical component; refining the model based on the rules including adjusting a degree of confidence of accuracy of indications in the model based on satisfaction of the rules; and selecting a subset of (Continued)

network components in the refined model for inclusion in the SDN specification.

8 Claims, 6 Drawing Sheets

(58) Field of Classification Search
USPC .......................................................... 709/226
See application file for complete search history.

(56) References Cited

U.S. PATENT DOCUMENTS

| | | | |
|---|---|---|---|
| 2009/0238079 | A1 | 9/2009 | Gantenbein et al. |
| 2013/0148513 | A1 | 6/2013 | Szabo et al. |
| 2017/0201425 | A1 | 7/2017 | Marinelli et al. |
| 2018/0309629 | A1 | 10/2018 | Mohanram et al. |
| 2018/0309640 | A1 | 10/2018 | Nagarajan et al. |
| 2018/0351791 | A1* | 12/2018 | Nagarajan ........... H04L 41/0895 |
| 2019/0036816 | A1 | 1/2019 | Evans et al. |
| 2019/0173736 | A1* | 6/2019 | Ponnuswamy ....... H04L 41/145 |
| 2020/0067772 | A1 | 2/2020 | Tomkins et al. |

OTHER PUBLICATIONS

"Examination Report under Section 18(3) for Great Britain Application No. 2003811.3, dated Jan. 13, 2022".
"Extended European Search Report for Application No. 20163460.7, dated Aug. 14, 2020".
"Extended European Search Report for Application No. 20163462.3, dated Aug. 14, 2020".
"International Preliminary Report on Patentability received for PCT Patent Application No. PCT/EP2021/055637, dated Sep. 29, 2022".
"International Preliminary Report on Patentability received for PCT Patent Application No. PCT/EP2021/055638, dated Sep. 29, 2022".
"International Search Report and Written Opinion for Application No. PCT/EP2021/055637, dated Mar. 19, 2021".
"Search Report under Section 17 for Great Britain Application No. 2003811.3, dated Sep. 17, 2020".
Badotra, et al., "Open Daylight as a Controller for Software Defined Networking", International Journal of Advanced Research in Computer Science, vol. 8, No. 5, May-Jun. 2017, pp. 1105-1111.
Bowers, K., et al., "Smart Infrastructure Getting more from Strategic Assets", Cambridge Centre for Smart Infrastructure and Construction, 7 pages.
Erickson, David, "The Beacon OpenFlow Controller", Stanford University, available at http://yuba.stanford.edu/-derickso/docs/hotsdn 15-erickson.pdf, 6 pages.
Extended European Search Report for Application No. 20163461.5 dated Jun. 24, 2020, 11 pages.
"Geospatial Commission Making Geospatial Data More Accessible," UK Government, Available from https://www.gov.uk/government/news/geospatial-commission-making-geospatial-data-more-accessible, Apr. 18, 2019, 3 pages.
International Search Report and Written Opinion for Application No. PCT/EP2021/055638, dated May 6, 2021, 14 pages.
Rusek K., et al., "Unveiling the Potential of Graph Neural Networks for Network Modeling and Optimization in SDN," arxiv.org, Jan. 23, 2019, 12 pages.
Search Report under Section 17(5) for GB Application No. 2003810.5 dated Dec. 4, 2020, 3 pages.
UK Government: Asset Information Management—Common Data Environment Functional Requirements, Feb. 2018, Retrieved from the Internet: https://www.cdbb.cam.ac.uk/Resources/ResoucePublications/BIMLevel2AIMCDEFunctionalRequirements20181.pdf, 47 pages.
UK Government: Press Release Map of Underground Pipes and Cables Designed to Save Lives and Prevent Major Disruption, Apr. 25, 2019, Retrieved from the Internet: https://www.gov.uk/government/news/map-of-underground-pipes-and-cables-designed-to-save-lives-and-prevent-major-disruption, 5 pages.

* cited by examiner

SOFTWARE DEFINED NETWORK SPECIFICATION

PRIORITY CLAIM

The present application is a National Phase entry of PCT Application No. PCT/EP2021/055638, filed Mar. 5, 2021, which claims priority from EP Patent Application No. 20163461.5, filed Mar. 16, 2020 each of which is hereby fully incorporated herein by reference.

TECHNICAL FIELD

The present disclosure relates to modeling of communications network infrastructure of a transmission network of a utility service for the specification of a software defined network.

BACKGROUND

Utility service providers have transmission networks for the transport, provision, communication or conveyance of a utility such as power (including electricity), gas (including natural gas), liquid (including water), sewage and communications facilities (including fixed-line and/or mobile telephony and network connections such as broadband services). Transmission networks are comprised of network infrastructure including means and mechanisms for the transmission of the utility. Such infrastructure includes infrastructure components that can be categorized into component types. One categorization can include, for example, types according to a nature of a component such as a conduit, transmission wire, emitter or receiver or the like. Infrastructure components can include, for example, a duct, conduit, pipe, cable, pole, pylon, tower, and other transmission network infrastructure components as will be apparent to those skilled in the art.

Specific types of utility service can have specific infrastructure components. For example, a communications service such as a telecommunications, network communications or broadband service can include physical network components such as appliances, links, routers, switches, aggregators and the like for providing the utility service. Such services can be employed in the provision of other services such as software-defined networks (SDNs). Furthermore, in addition to physical infrastructure components, logical components can be provided such as logical appliances, facilities or apparatus. Such logical components can be provided using, for example, virtualization, aggregation, simulation, or other technology based on underlying physical components. Such logical components thus depend on underlying physical components.

Utility service providers are increasingly subject to infrastructure sharing obligations which require the provision of access to physical infrastructure components to third parties. For example: ducts and poles can be shared; power can be shared; infrastructure site access can be shared; and physical or logical network components can be provided for network communications or SDN deployment. These obligations on infrastructure owners introduce an additional requirement for comprehensive and accurate information about the nature of infrastructure such as which components are provided, their location and the nature of such components.

SUMMARY

Accordingly, it is beneficial to provide improvements in the provision of information relating to components in a utility service infrastructure.

According to a first aspect of the present disclosure, there is provided a computer implemented method to specify a software defined network (SDN) for deployment by an SDN controller, the SDN controller being adapted to configure a plurality of physical network components to deliver communication services, the method comprising: generating a model of the physical network components by the steps of: a) accessing each of a plurality of data sources, each data source including records each storing information on at least a subset of the set of physical components including a location and type of each physical component in the subset and interconnections between physical components, wherein each record has associated an indication of a degree of confidence of an accuracy of the record; b) defining the model including an indication of a location, type and interconnections of physical components based on the data sources, wherein records of the data sources having common location and type are aggregated for indication in the model; c) associating each indication in the model with a degree of confidence of accuracy of the indication based on the degree of confidence information from the data sources; d) accessing a set of rules defining relationships between types of physical component; and e) refining the model based on the rules including adjusting a degree of confidence of accuracy of indications in the model based on satisfaction of the rules; and selecting a subset of network components in the refined model for inclusion in the SDN specification.

In some embodiments, the method further comprises deploying the SDN based on the SDN definition.

In some embodiments, the method further comprises triggering a survey process for a subset of physical components in the physical network, the subset corresponding to indications in the refined model having a degree of confidence of accuracy meeting a predetermined threshold degree of confidence.

In some embodiments, the survey process includes one or more of: a physical discovery process; and an imaging process.

In some embodiments, refining the model based on the rules includes the steps of: inferring an additional physical component including an inferred location and type of the additional component and adding an indication for the additional component to the model, the additional physical component being inferred based on the rules and a subset of the indications in the model; and associating a degree of confidence of accuracy of the indication for the additional component based on a degree of confidence associated with at least some indications in the subset of indications.

In some embodiments, records included in at least a subset of the data sources include a status indication for at least a subset of physical components, the status indication identifying a state of a physical component as one or more of: an operational state; and a configuration state if the physical component.

According to a second aspect of the present disclosure, there is provided a computer system including a processor and memory storing computer program code for performing the method set out above.

According to a third aspect of the present disclosure, there is provided a computer program element comprising computer program code to, when loaded into a computer system and executed thereon, cause the computer to perform the method as described above.

BRIEF DESCRIPTION OF THE DRAWINGS

Embodiments of the present invention will now be described, by way of example only, with reference to the accompanying drawings, in which.

DETAILED DESCRIPTION

Figure 1:
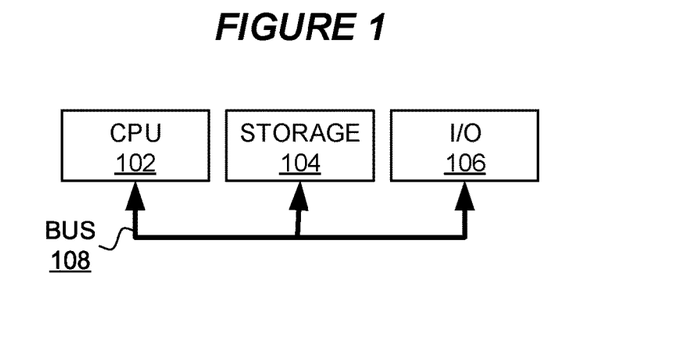
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Embodiments of the present disclosure provide improvements in the modelling of infrastructure for a utility service. In particular, existing infrastructure information is employed to generate a model of infrastructure by a process of information aggregation and refinement. Refinement can include, for example, inferencing techniques based on infrastructure rules defining relationships between infrastructure components. Such a model has utility in the definition of deployment specifications for, inter alia, new infrastructure components such as new physical or logical components and/or the definition of software defined networks (SDNs).

Figure 2:
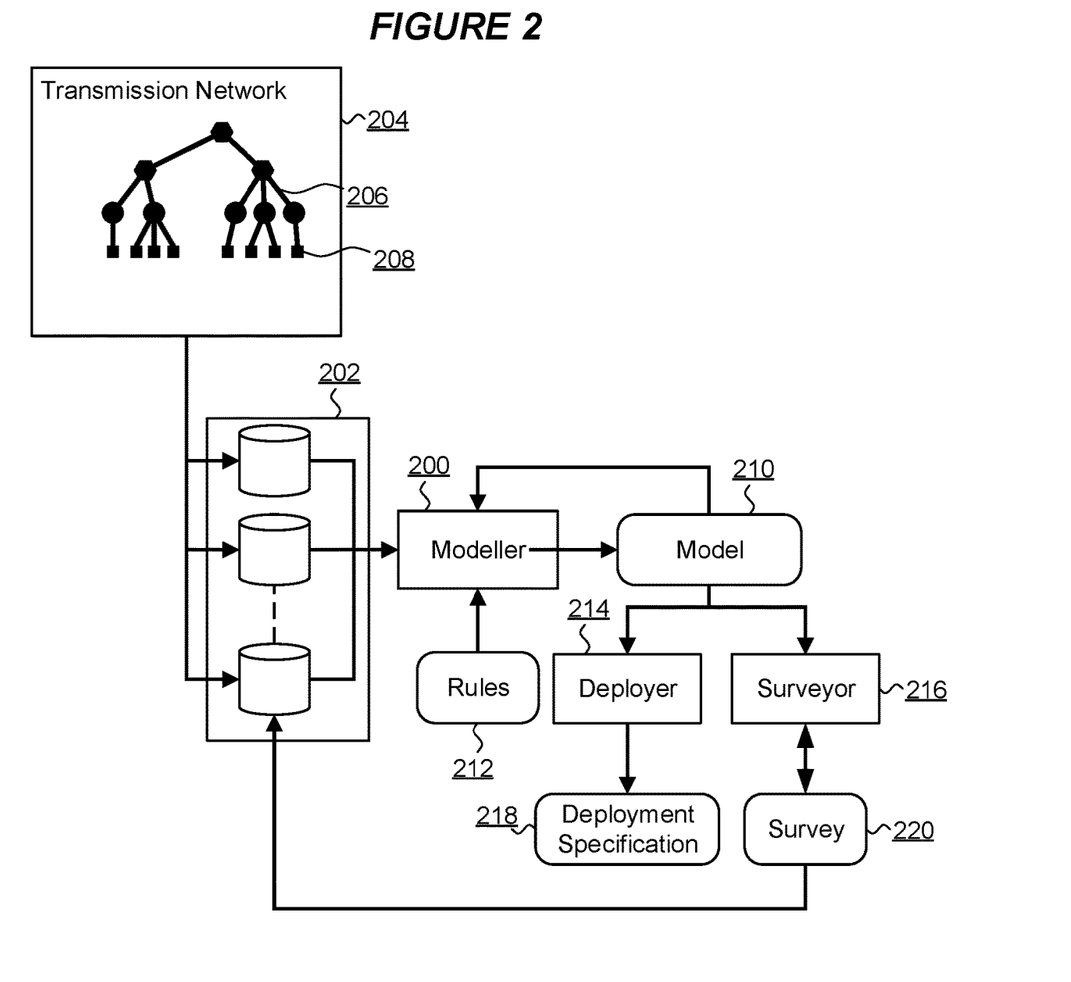
FIG. 2 is component diagram of an arrangement for modeling physical infrastructure of a transmission network for a utility service in accordance with embodiments of the present disclosure.

FIG. 2 is component diagram of an arrangement for modeling physical infrastructure of a transmission network 204 for a utility service in accordance with embodiments of the present disclosure. A transmission network 204 is provided for the transport, provision, communication or conveyance of a utility such as power (including electricity), gas (including natural gas), liquid (including water), sewage and communications facilities (including fixed-line and/or mobile telephony and network connections such as broadband services). The transmission network 204 of FIG. 2 includes physical infrastructure as a set of physical components 206, 208 in the network 204. Examples of such physical components can include, for example, endpoints, processors or facilitators of transmission of a utility such as sources, sinks, emitters, receivers, adapters, filters, valves, throttles, aggregators, multiplexers, demultiplexers, access points, converters, poles, antennae, masts, towers, stations and the like, such as the physical components indicated generally at 208. Additionally or alternatively, physical components can include conduits, paths, routes, cables, trunks, lines, pipes, connections or other transmission means or media such as are generally indicated at 206. Notably, each physical component 206, 208 belongs to a class of physical component indicating its type of component. Thus, in a telecommunications network, telegraph poles man be commonly classified as such, for example, as distinct to a cable duct which may be classified as a different type. Furthermore, each physical component has a location in the transmission network 204 as a geographic, spatial, relative or discrete location.

The nature, configuration and layout of the transmission network 204 is determinate in that a comprehensive survey of all components in the network 204 including component types and locations can be conducted. However, conventionally, utility service providers have limited or deficient data in relation to the nature, configuration and layout of the transmission network 204, and providing a complete record of the network 204 can be a resource intensive manual exercise.

A set of physical infrastructure data sources 202 are provided, such as may be available to a utility service provider including information relating to physical components in the transmission network 204. Such data sources 202 can include records, databases or other sources of data each including records storing information on at least a subset of physical components in the transmission network 204. Data sources can include, for example, inter alia: records arising from a deployment of components of the infrastructure; records arising from maintenance of components of the infrastructure; records arising from fault analysis of the infrastructure; and records arising from proactive or incidental analysis and/or survey activities such as: system analysis; fault analysis; inference; sensing; performance analysis; ground penetrating radar analysis; satellite and/or mapping imagery; street-level imagery; mobile camera imagery; crowd-sourced surveying; drone surveying; physical surveying; information from other utility service providers, and other sources as will be apparent to those skilled in the art. Records stored by the data sources 202 include location and type information for components in the transmission network 204. In some embodiments, at least a subset of records stored by one or more of the data sources 202 can include a status indication of a status of a corresponding infrastructure component, such as an operational state of the component (installed, functional, non-functional, failure, fault etc.) and/or a configuration state of the component (such as one or more configuration parameters, an orientation, material(s) of manufacture, capacity, capability, age, usage etc.).

Each data source 202 can be incomplete and non-comprehensive in respect of full details of components of the transmission network 204 and/or may include errors, inaccuracies or assumptions about components in the network 204. To reflect this, each record of data sources 202 has associated an indication of a degree of confidence of an accuracy of the record. Such indications of a degree of confidence can be provided on a per-record or some subset of records basis. Additionally or alternatively, such indications can be provided for one or more entire data sources. Different data sources can employ different approaches. The indication of a degree of confidence of accuracy can be determined based on one or more of: a manual input for a record or data source; an age or provenance of a record or data source; a manner of obtaining the record or data source; a recency of verifying the record or data source; or other methods as will be apparent to those skilled in the art.

A modeler 200 is provided as a hardware, software, firmware or combination component adapted to generate a model 210 of infrastructure components in the transmission network 204. The model 210 can be a data structure representation of infrastructure components indicating, for each component, a type, location and degree of confidence of accuracy of the indication for the component. For example, the model 210 can be provided as a graph data structure with components and, optionally, relationships between components indicated in the model.

In use, the modeler 200 generates the model 210 of physical infrastructure based on the data sources 202. Thus, infrastructure components identified in the data sources 202 are provided as indications in the model 210 including a location and type of each component based on the record(s) relating to the component in the data sources 202. The modeler 200 is further adapted to aggregate records in the data sources 202 determined to relate to common infrastructure components, such as by having common location and type information. Thus, where records in the data sources 202 identify components that may, in fact, be the same component, they are aggregated for indication in the model 210. Thus, the modeler 200 consolidates the information from the data sources 202 into the model 210. Furthermore, the modeler 200 associates a degree of confidence of accuracy of each indication in the model 210 based on the degree of confidence of information from the data sources 202. Notably, where multiple records in the data sources 202 are aggregated for indication as a single infrastructure component in the model 210, the degree of confidence can be derived by some combination of the degree of confidence associated with each aggregated record. For example, a highest degree of confidence can be selected from all records, or an aggregate degree of confidence, or a degree of confidence reflective of a number of records so aggregated.

Subsequently, the modeler 200 is adapted to refine the model 210—such as on an iterative basis. Each refinement is based on rules 212 accessed by the modeler 200. The rules 212 define relationships between types of infrastructure component and can be used to refine the model 200. For example, rules can include indications of a hierarchy, layout, arrangement or configuration of a set of infrastructure components on which basis characteristics of one or more components can be inferred such as a type or location of a component. Thus, where records in the data sources 202 are absent some subset of information for an infrastructure component, contain erroneous information for a component, or have associated a relatively lesser degree of confidence of an accuracy of information for a component, such inadequacies in the records of the data sources 202 can be overcome by inferring type or location information for a component based on such rules, and indications of such components (including such inferences) can be included by refinement of the model 210. For example, in a telecommunications network, rules corresponding to an arrangement of infrastructure components can be defined such that, for example, a hierarchy of components is provided from a telecommunications exchange, a street-side cabinet, a distribution point, and a customer's premises, each such attribute indicating a type of an infrastructure component at each location. Thus, a series of infrastructure components all associated with a known distribution point may all be inferred to constitute a customer premise equipment.

Furthermore, rules can be provided relating to the design, layout, arrangement, configuration or relative location of infrastructure components on which basis records of the data sources 202 can be assessed and indications in the model 210 can be refined. For example, where location information is provided for an infrastructure component with a relatively low degree of confidence of accuracy, relative location information defined in rules 212 can be used to infer location information with a greater degree of accuracy. By way of example, in a telecommunications network, rules can be provided defining typical, maximum and/or average distances between infrastructure components such as distances between a street-side cabinet and a distribution point; and/or distances between a distribution point and a customer's premises. Such information corresponding to the layout of infrastructure components can be used to refine location information for indications of components in the model 210.

Other rules 212 can be additionally or alternatively employed as will be apparent to those skilled in the art such as rules relating to the connectivity of and/or between infrastructure components; rules relating to the lifespan, performance and/or maximum age of a component; and the like.

In some embodiments, the refinement of the model 210 by the modeler 200 includes inferring one or more additional infrastructure components in the model 210, the additional components including an inferred location and type. Such inferred additional components can be provided where rules 212 indicate a constraint on a the transmission network that is not reflected in the records of the data sources 202. For example, in a telecommunications network, where all street-side cabinets are known to operate with an exchange and there is an absence of information regarding such an exchange in the data sources 202, a new component can be indicated in the model 210 to represent the exchange in accordance with the rules 212. Such inferred additional components can have associated a degree of confidence of accuracy reflective of their inferred nature, such as a relatively lower degree of confidence. This may particularly be the case in respect of a location of such components. In one embodiment, such additional infrastructure components can be inferred based on the rules 212 and some subset of indications in the model 210, such as a set of indications of components in the model 210. In such an embodiment, a degree of confidence of an inferred additional infrastructure component can be determined based on a degree of confidence associated with each component in the subset, such that more certain information relating to the subset can lead to a greater degree of certainty of an inferred additional component, for example.

Thus, in use, the modeler 200 refines the model 210 based on the rules 212. As part of the refinement process, the modeler 200 further adjusts a degree of confidence of accuracy of the indications of infrastructure components in the model 210 based on satisfaction of the rules. For example, where indications of components in the model 210 are found to satisfy, or are refined to satisfy, the rules 212, a degree of confidence can improve.

The model 210 accordingly constitutes a representation of infrastructure components in the transmission network 204 that improves over the mere aggregation of information from existing data sources 202 by the process of refinement based on the rules 212. Further, the model 210 includes a refined information on degrees of confidence for each component indication in the model 210. In some embodiments, the model 210 provides for the deployment of one or more additional infrastructure components by way of a deployer 214 component as a hardware, software, firmware or combination component. The deployer 214 is arranged to define a deployment specification for one or more new infrastructure components for deployment in the transmission network 204 based on the model 210 of the network 204. In particular, the deployer 214 can select and/or determine a location and type for such new components based on the refined model 210.

In one embodiment, the model 210 is suitable for triggering a survey process by a surveyor 216 such as an automated or manual surveying process. For example, the surveyor 216 can be triggered where a degree of confidence of accuracy of one or more indications in the model 210 meets a predetermined threshold degree of confidence, such as by falling below a threshold degree of confidence. The surveyor 216 can be triggered to perform one or more surveys of locations and/or specific infrastructure components to update, improve, augment, supplement or otherwise revise records stored in the data sources 202. Such surveys can include automated surveys by sensoring, monitoring, tracking, tracing, drone, imaging, or other surveying techniques as will be apparent to those skilled in the art.

Figure 3:
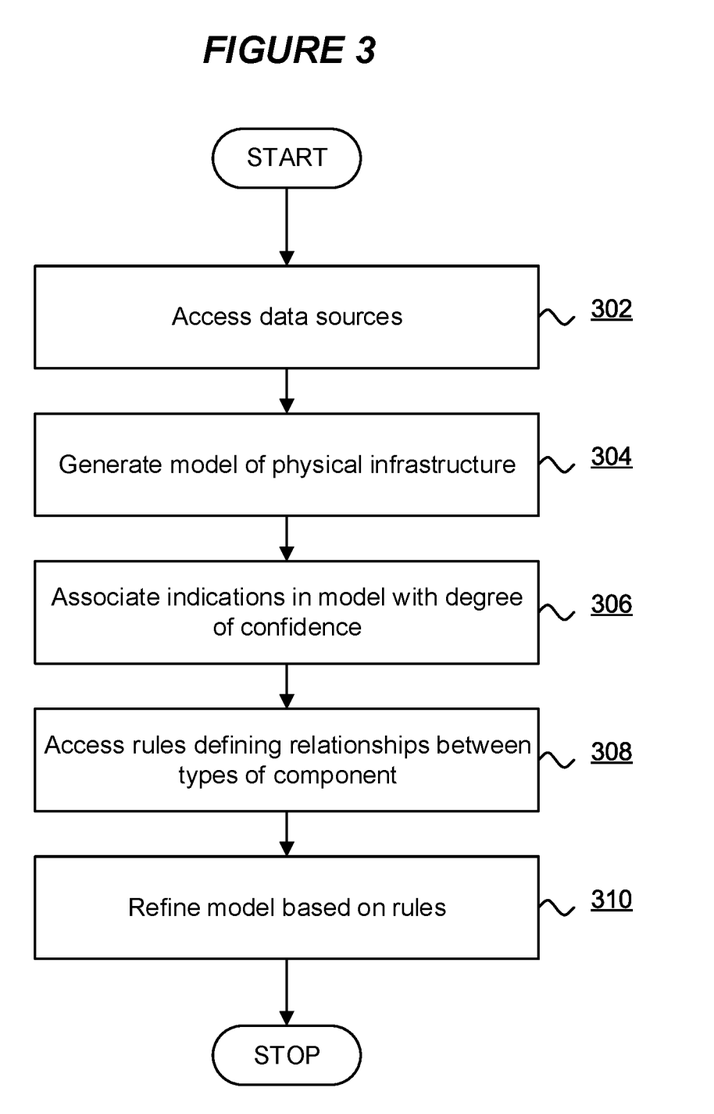
FIG. 3 is a flowchart of a method for modeling physical infrastructure of a transmission network for a utility service in accordance with embodiments of the present disclosure.

FIG. 3 is a flowchart of a method for modeling physical infrastructure of a transmission network for a utility service in accordance with embodiments of the present disclosure. Initially, at 302, each of a plurality of physical infrastructure data sources 202 are accessed. Each data source includes records each storing information on at least a subset of physical components in the transmission network 204. Information for components includes a location and type of each physical component and each record includes an indication of a degree of confidence of an accuracy of the record. At 304, the modeler 200 generates a model 210 of the physical infrastructure of the transmission network 204. The model 210 includes an indication of a location and type of physical components determined based on the data sources 202. Records in the data sources 202 having common location and type information are aggregated for indication in the model 210. At 306 the method associates each indication in the model 210 with a degree of confidence of accuracy of the indication. The degree of confidence in the model 210 is determined based on degree of confidence information from the data sources 202. At 308 the method accesses rules 212 defining relationships between types of physical component. At 310 the modeler 200 refines the model 210 based on the rules 212. The refinement includes adjusting a degree of confidence of accuracy of indications in the model 210 based on satisfaction of the rules 212

Figure 4:
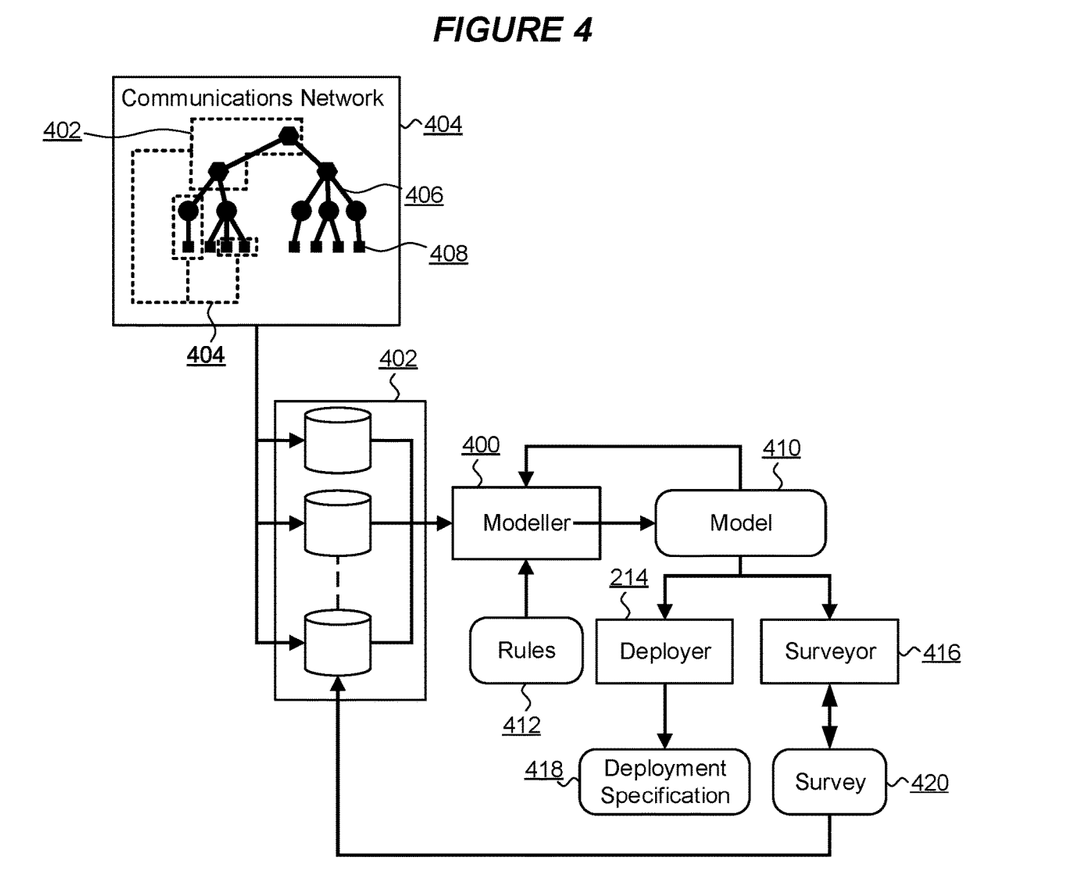
FIG. 4 is a component diagram of an arrangement for modelling infrastructure of a communications network in accordance with embodiments of the present disclosure.

FIG. 4 is a component diagram of an arrangement for modeling infrastructure of a communications network 404 in accordance with embodiments of the present disclosure. Many of the elements of FIG. 4 are identical to those described above with respect to FIG. 2 and these will not be repeated here. Whereas FIG. 2 relates to a transmission network of any suitable utility service provider, the arrangement of FIG. 4 is specifically directed to a network communications utility service such as a network, internet, broadband, telecommunications or other suitable network communications utility service. The communications network 404 includes physical infrastructure components 406, 408 such as network routers, switches, terminals, connections, cables and the like. Additionally, the network 404 includes logical infrastructure components 402, 404 such as virtual network appliances, logical subnetworks, subnets, logical servers such as virtual or aggregate servers, server farms, consolidated network components, logical network links such as transmission control protocol (TCP) connections, virtual private networks (VPNs), software-defined networks (SDNs) and the like as will be apparent to those skilled in the art. Notably, logical components in the communications network involve physical components in their provision and/or realization. For example, a TCP connection can involve underlying physical layer communications links to provide a transport layer logical connection. Thus, the infrastructure components in the communications network 404 differ from the transmission network of FIG. 2 in that they includes both physical and logical components.

Thus, according to the arrangement of FIG. 4, the data sources 402 additionally include records storing information on logical components including a type of each logical component and an identification of one or more physical components involved in providing the logical component. Otherwise, the data sources 402 and the records provided thereby are consistent with those described above with respect to FIG. 2.

Furthermore, the modeler 400 is substantially as previously described and additionally includes, in the model 410, indications of logical components in the network 404 by way of, for example, indications in the model 410 of associations between physical components for the provision of logical components. Further, aggregation by the modeler 400 of records from the data sources 402 is based on a common identification of physical components involved in the provision of logical components in addition to location and type information.

In use, refinement by the modeler 400 is based on rules 412 including rules relating to logical components, and the refinements made to the model 410 can include refinements to logical components. In use, the deployer 214 can be adapted to provide a deployment specification 418 for a logical component including an identification of physical components for use in providing such logical component based on the refined model 410.

Figure 5:
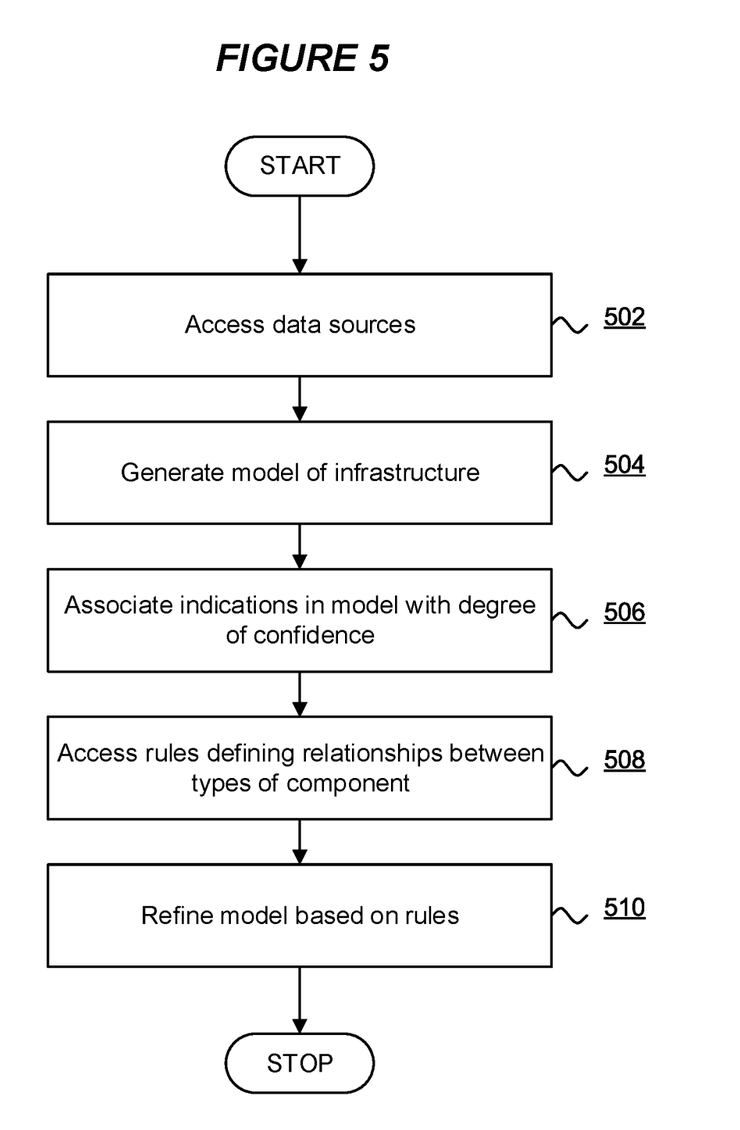
FIG. 5 is a flowchart of a method for modeling infrastructure of a communications network in accordance with embodiments of the present disclosure.

FIG. 5 is a flowchart of a method for modeling infrastructure of a communications network in accordance with embodiments of the present disclosure. Initially, at 502, the modeler 400 accesses infrastructure data sources 402. Each infrastructure data source 402 includes records each storing information on one or more of: physical components including a location and type of each physical component; and logical components including a type of each logical component and an identification of one or more physical components involved in providing the logical component. Each record in the data sources 402 has an indication of a degree of confidence of an accuracy of the record. At 504 the modeler 402 generates a model 410 of the infrastructure of the communications network 404. The model 410 includes an indication of a location and type of physical components. The model 410 also includes associations between physical component for the provision of logical components. Records in the data sources 404 having common location, common type and/or common identification of physical components involved in providing a logical component are aggregated for indication in the model 410. At 506 each indication in the model is associated with a degree of confidence of accuracy of the indication based on a degree of confidence information from the data sources 402. At 508 the modeler 400 accesses rules 412 defining relationships between types of component. At 510 the modeler 410 refines the model 410 based on the rules 412 and adjusting a degree of confidence of accuracy of indications in the model 410 based on satisfaction of the rules.

Figure 6:
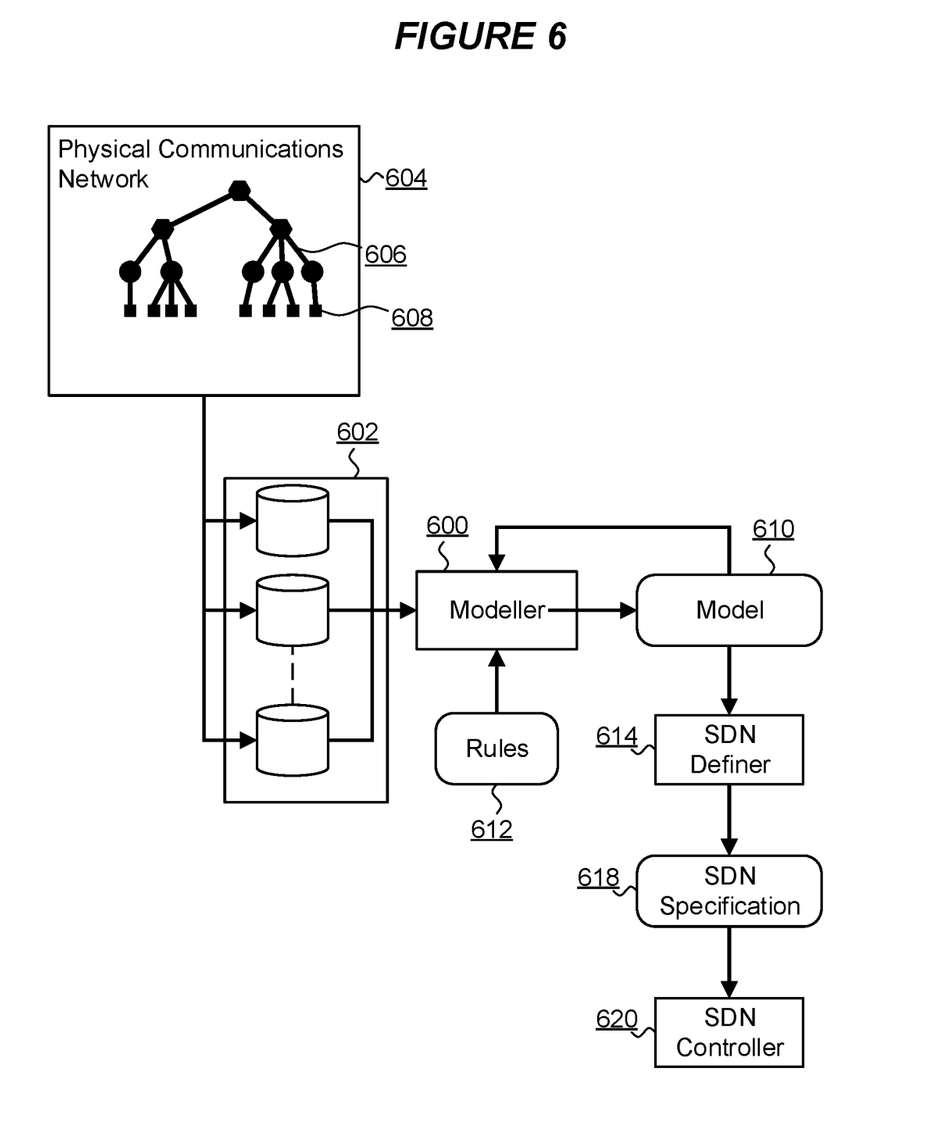
FIG. 6 is a component diagram of an arrangement for defining a software defined network in accordance with embodiments of the present disclosure.

FIG. 6 is a component diagram of an arrangement for defining a software defined network (SDN) in accordance with embodiments of the present disclosure. Many elements of FIG. 6 are identical to those described above and these will not be repeated here.

SDNs provide dynamic configuration of physical or virtualized network components such as switches and routers for the purpose of providing network services for network applications. Divided logically into a "data plane", consisting of network components, and a "control plane", consisting of logic for configuring and controlling the network components, a particular specification of an SDN configuration by an SDN controller 620 seeks to provide network services in an efficient and reliable manner Embodiments of the present invention provide a refined model 610 of physical network components 606, 608 in a physical communications network 604 on which basis an SDN specification 618 is provided by an SDN definer 614 component. The model 610 is generated and refined as previously described with reference to FIG. 2. The SDN definer 614 is a software, hardware, firmware or combination component adapted to define an SDN specification 618 as a specification of an implementation of an SDN for deployment and/or instantiation by an SDN controller 620. For example, the SDN specification 618 can be an identification of one or more SDN components and/or criteria for components and interconnections therebetween for provision of an SDN by the SDN controller 620. In use, the SDN definer 614 selects a subset of network components from the physical communications network 604 for as indicated in the refined model 610 for inclusion in the SDN specification 618.

The SDN controller 620 is provided as a hardware, software, firmware or combination component or set of components for providing control functionality for a set of physical network components 606, 608 in a physical communication network providing, for example, data forwarding, switching and routing facilities. Thus, the SDN controller 620 implements a particular control configuration defining rules according to which the configuration of each of at least a subset of the physical network components 606, 608 are configured. Such rules can include, for example, a routine, forwarding, data flow or switching rule for a network component 608.

The SDN controller 620 further provides interfaces, services and/or facilities for network applications seeking to communicate via one or more communication networks. For example, the SDN controller 620 can provide flow control for one or more network components using an SDN controller protocol such as OpenFlow. Examples of SDN controller 620 include: Beacon, a Java-based OpenFlow SDN controller that supports both event-based and threaded operation (see "The Beacon OpenFlow Controller" (David Erickson, Stanford University) available at www.yuba.stanford.edu; and OpenDaylight from the Linux Foundation (see "Open Daylight as a Controller for Software Defined Networking", Badotra and Singh, 2015, IJARCS available from www.researchgate.net).

Thus, in use, the modeler 600 generates and refines the model 610 of physical network components in the physical communications network 604 based on records from the data sources 602 and the rules 612. Notably, the data sources 602 include records providing information about physical components in the network 604 and interconnections between physical components in the network 604. The SDN definer 614 generates an SDN specification 618 specifying a subset of the physical network components for deployment of the SDN specification 618 by an SDN controller 620.

Figure 7:
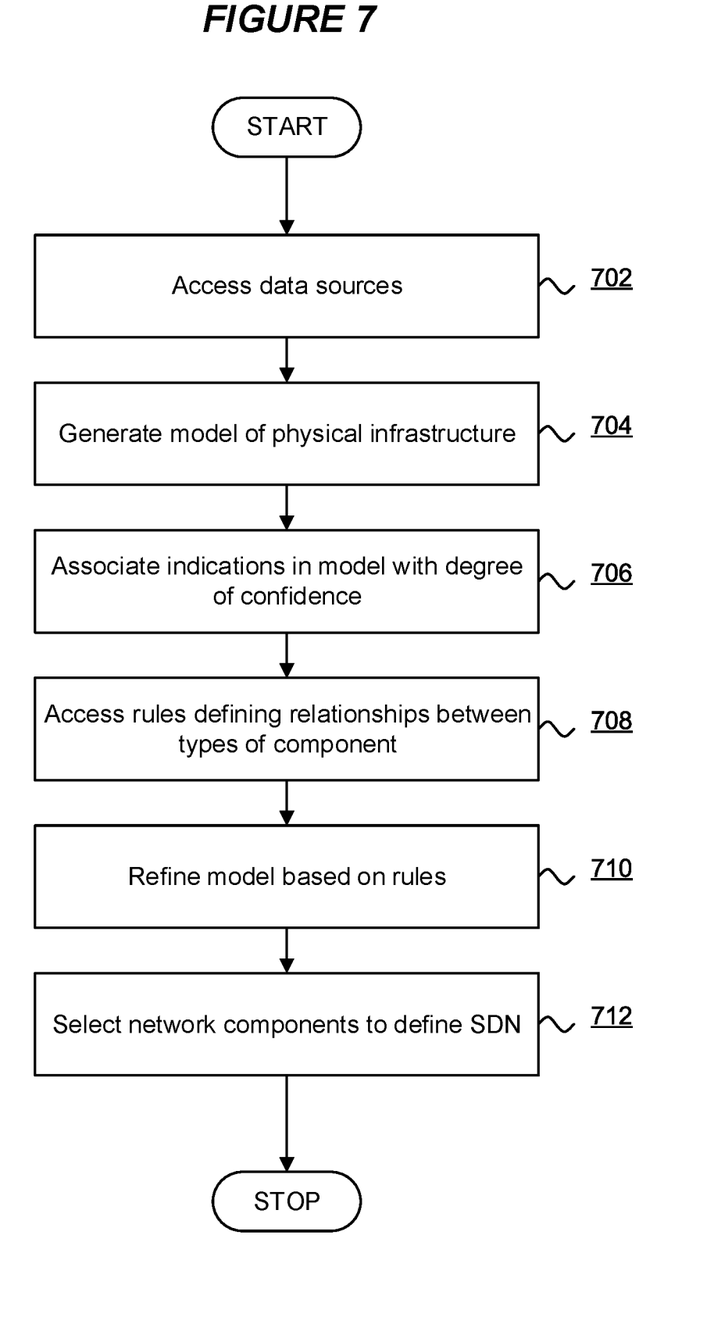
FIG. 7 is a flowchart of a method for defining a software defined network in accordance with embodiments of the present disclosure.

FIG. 7 is a flowchart of a method for defining a software defined network in accordance with embodiments of the present disclosure. The method generates a model of the physical network components. At 702 the modeler 600 accesses the data sources 602, each data source including records each storing information on physical components in the physical communications network 604. Information for each physical component includes a location and type of the physical component and interconnections between physical components. Each record in the data sources 602 has an indication of a degree of confidence of an accuracy of the record. At 704 the modeler 600 defines the model 610 including indications of location, type and interconnections of physical components in the network. Records of the data sources 602 having common location and type are aggregated for indication in the model 610. At 706 the modeler 600 associates each indication in the model with a degree of confidence of accuracy of the indication based on the degree of confidence information from the data sources 602. At 708 the modeler accesses a set of rules 612 defining relationships between types of physical component in the network 604. At 710 the modeler 600 refines the model 610 based on the rules 612. The refinement includes adjusting a degree of confidence of accuracy of indications in the model 610 based on satisfaction of the rules 612. At 712 the SDN definer 614 selects a subset of network components in the refined model 610 for inclusion in the SDN specification 618 for deployment by the SDN controller 620.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to specify a software defined network (SDN) for deployment by an SDN controller, the SDN controller being adapted to configure a plurality of physical network components to deliver communication services, the method comprising:
generating a model of the physical network components by:
accessing each of a plurality of data sources, each of the plurality of data sources including records each storing information on at least a subset of the plurality of physical network components including a location and a type of each physical network component in the subset and interconnections between the physical network components, wherein each record has associated an indication of a degree of confidence of an accuracy of the record,
defining the model including an indication of the location, the type and the interconnections of the physical network components based on the plurality of data sources, wherein the records of the data sources having a common location and a common type are aggregated for indication in the model,
associating each indication in the model with a degree of confidence of an accuracy of the indication based on the degree of confidence of the accuracy of the record,
accessing a set of rules defining relationships between types of physical components, and
refining the model based on the rules including adjusting the degree of confidence of the accuracy of indications in the model based on satisfaction of the rules; and
selecting a subset of physical network components in the refined model for inclusion in the SDN specification.

2. The method of claim 1, further comprising deploying the SDN based on the SDN specification.

3. The method of claim 1, further comprising triggering a survey process for a subset of the physical network components in the physical network, the subset corresponding to indications in the refined model having a degree of confidence of accuracy meeting a predetermined threshold degree of confidence.

4. The method of claim 3, wherein the survey process includes one or more of: a physical discovery process; and an imaging process.

5. The method of claim 1, wherein refining the model based on the rules includes:
inferring an additional physical network component including an inferred location and an inferred type of the additional physical network component and adding an indication for the additional physical network component to the model, the additional physical network component being inferred based on the rules and a subset of the indications in the model; and
associating a degree of confidence of accuracy of the indication for the additional physical network component based on a degree of confidence associated with at least some indications in the subset of indications.

6. The method of claim 1, wherein the records included in at least a subset of the data sources include a status indication for at least a subset of the physical network components, the status indication identifying a state of a physical network component as one or more of: an operational state; and a configuration state of the physical component.

7. A computer system comprising:
a processor and memory storing computer program code for specifying a software defined network (SDN) for deployment by an SDN controller, the SDN controller being adapted to configure a plurality of physical network components to deliver communication services, by:
generating a model of the physical network components by:
accessing each of a plurality of data sources, each of the plurality of data sources including records each storing information on at least a subset of the plurality of physical network components including a location and a type of each physical network component in the subset and interconnections between the physical network components, wherein each record has associated an indication of a degree of confidence of an accuracy of the record,
defining the model including an indication of the location, the type and the interconnections of the physical network components based on the plurality of data sources, wherein the records of the data sources having a common location and a common type are aggregated for indication in the model,
associating each indication in the model with a degree of confidence of an accuracy of the indication based on the degree of confidence of the accuracy of the record,
accessing a set of rules defining relationships between types of physical components, and
refining the model based on the rules including adjusting the degree of confidence of the accuracy of indications in the model based on satisfaction of the rules; and
selecting a subset of physical network components in the refined model for inclusion in the SDN specification.

8. A non-transitory computer-readable storage medium storing computer program code to, when loaded into a computer system and executed thereon, cause the computer system to specify a software defined network (SDN) for deployment by an SDN controller, the SDN controller being adapted to configure a plurality of physical network components to deliver communication services, by:
generating a model of the physical network components by:
accessing each of a plurality of data sources, each of the plurality of data sources including records each storing information on at least a subset of the plurality of physical network components including a location and a type of each physical network component in the subset and interconnections between the physical network components, wherein each record has associated an indication of a degree of confidence of an accuracy of the record,
defining the model including an indication of the location, the type and the interconnections of the physical network components based on the plurality of data sources, wherein the records of the data sources having a common location and a common type are aggregated for indication in the model,
associating each indication in the model with a degree of confidence of an accuracy of the indication based on the degree of confidence of the accuracy of the record,
accessing a set of rules defining relationships between types of physical components, and refining the model based on the rules including adjusting the degree of confidence of the accuracy of indications in the model based on satisfaction of the rules; and
selecting a subset of physical network components in the refined model for inclusion in the SDN specification.

\* \* \* \* \*